US012704489B2

(12) United States Patent
Borisova et al.

(10) Patent No.: US 12,704,489 B2
(45) Date of Patent: Aug. 11, 2026

(54) QUALITY CONTROL OF GC GAS FLOW

(71) Applicant: Schlumberger Technology Corporation, Sugar Land, TX (US)

(72) Inventors: Elena Borisova, Paris (FR); Pierre Beaudy, Chaville (FR); Jean Pierre Bailly, Clamart (FR)

(73) Assignee: Schlumberger Technology Corporation, Sugar Land, TX (US)

(*) Notice: Subject to any disclaimer, the term of this patent is extended or adjusted under 35 U.S.C. 154(b) by 263 days.

(21) Appl. No.: 18/680,741

(22) Filed: May 31, 2024

(65) Prior Publication Data

US 2025/0369936 A1 Dec. 4, 2025

(51) Int. Cl.

| | |
|---|---|
| ***G01N 30/88*** | (2006.01) |
| ***G01N 30/02*** | (2006.01) |
| ***G01N 30/08*** | (2006.01) |

(52) U.S. Cl.

CPC ............ *G01N 30/88* (2013.01); *G01N 30/08* (2013.01); *G01N 2030/025* (2013.01); *G01N 2030/085* (2013.01); *G01N 2030/8804* (2013.01); *G01N 2030/8854* (2013.01); *G01N 2030/889* (2013.01)

(58) Field of Classification Search

CPC .. G01N 30/88; G01N 30/08; G01N 2030/025; G01N 2030/085; G01N 2030/889; G01N 2030/8804; G01N 2030/8854

See application file for complete search history.

(56) References Cited

U.S. PATENT DOCUMENTS

| | | | | |
|---|---|---|---|---|
| 7,608,818 | B2 | 10/2009 | Miller | |
| 10,032,654 | B2 | 7/2018 | Negoro | |
| 2006/0288803 | A1* | 12/2006 | Weissgerber ........ | G05D 11/132 73/865.8 |
| 2008/0141758 | A1* | 6/2008 | Thompson ............ | G01N 30/32 73/23.42 |
| 2025/0258148 | A1* | 8/2025 | Francois ............ | G01N 30/8631 |
| 2025/0369937 | A1* | 12/2025 | Borisova ............... | G01N 30/88 |

* cited by examiner

*Primary Examiner* — Jonathan M Dunlap

(74) *Attorney, Agent, or Firm* — Kyle R. Miiller

(57) ABSTRACT

A method for quality control checking GC apparatus including at least a main column, a sample collection loop, and a detector in fluid communication with a multiport valve includes making first and second detector measurements when the multiport valve is set in corresponding first and second positions and a carrier gas inlet is open. The first position provides fluid communication between the carrier gas inlet, the sample collection loop, the main column, and the detector and the second position provides fluid communication between the carrier gas inlet, the main column, and the detector such that carrier gas bypasses the sample collection loop. The method further includes comparing the first and second detector measurements to check at least the sample loop and the multiport valve for leaks.

20 Claims, 9 Drawing Sheets

170
134
142
1
2
3
4
5
6
7
8
9
10
128
134
122
124
177
175
126
160

170
134
142
1
2
3
4
5
6
7
8
9
10
128
134
122
124
177
175
126
160

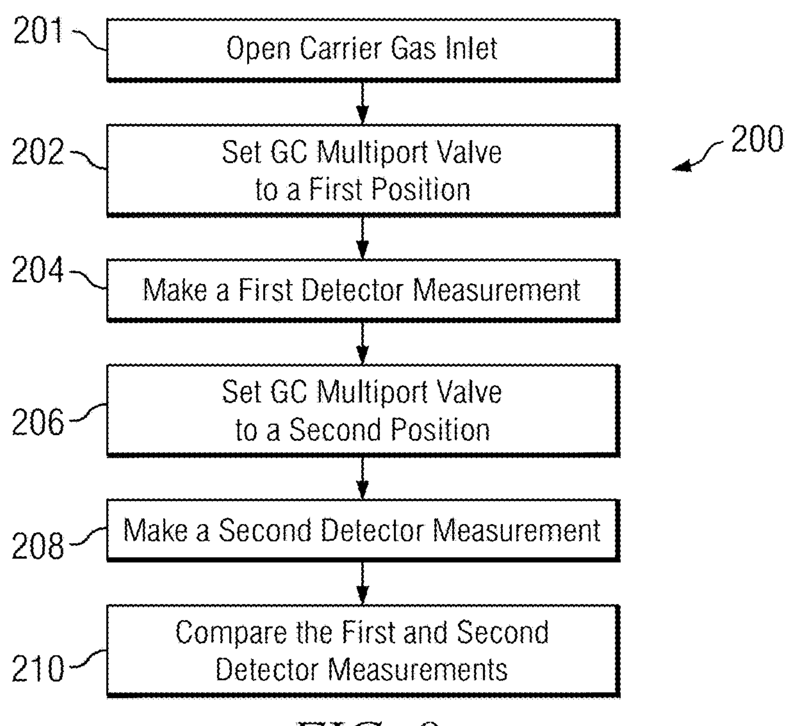
*FIG. 8*
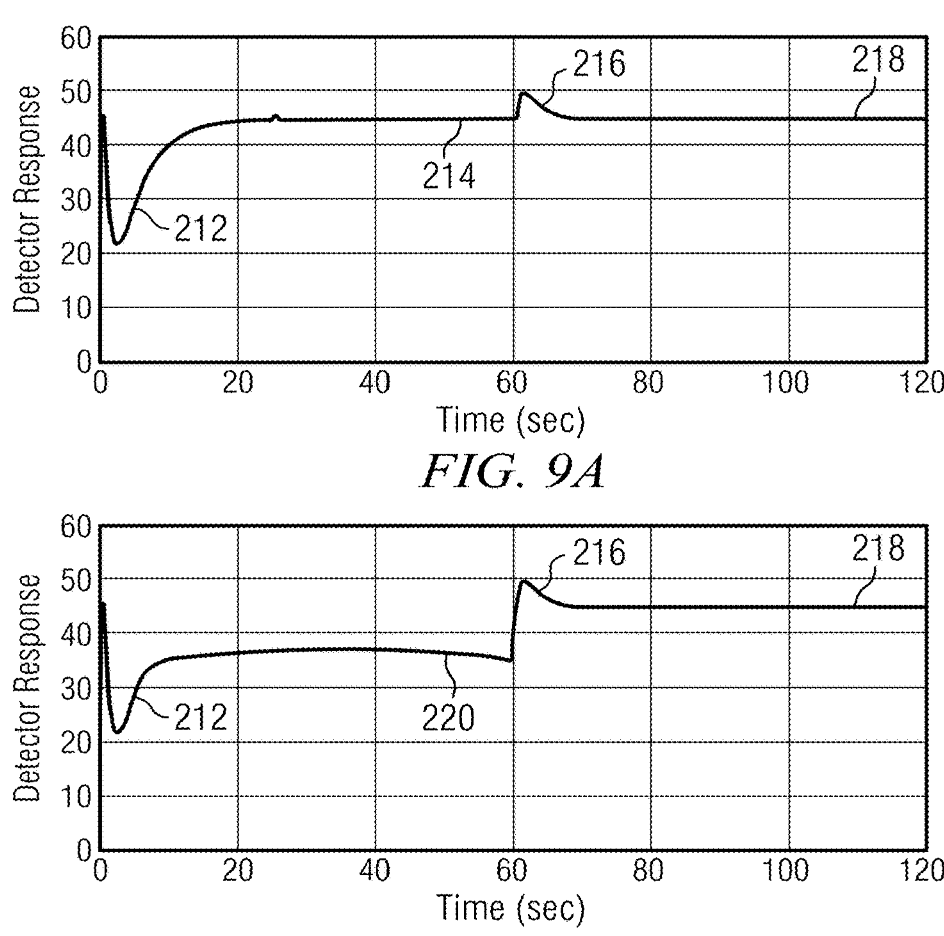
*FIG. 9A*
*FIG. 9B*

QUALITY CONTROL OF GC GAS FLOW

CROSS REFERENCE TO RELATED APPLICATIONS

None.

BACKGROUND

When drilling a subterranean wellbore, circulating drilling fluid commonly carries formation fluids and dissolved formation gasses to the surface. Such gasses may be liberated by the drill bit as it cuts the formation and may include various alkane gasses such as methane (C1), ethane (C2), propane (C3), butane (C4), pentane (C5), and the like, as well as alkenes and alcohols. The liberated gas stream is commonly evaluated at the surface while drilling to determine the composition of the dissolved gases in the drilling fluid. Such measurements may provide valuable information to a mud logger and may provide information about the maturity and nature of hydrocarbons in the reservoir, compartmentalization of intervals in the reservoir being drilled, and oil quality, as well as information regarding production zones, lithology changes, history of reservoir accumulation, or seal effectiveness.

Gas chromatography (GC) is often used to separate and analyze the liberated gases. In some operations, continuous GC measurements are made while drilling with the intent being to quantify the light hydrocarbon compounds (e.g., alkane gases from C1 to C5 or from C1 to C8 for an enriched and more complete analysis). Quality checks and quality control of the GC instrument are performed throughout its service life to ensure optimal performance. These QCs are commonly performed manually, for example, by dismounting the analyzer and verifying various flows and pressures in the system using hand-held measuring devices. Such quality checks are time consuming, and generally require off-site service by a highly skilled technician. Once completed the instrument is transported back to the rig. However, during transportation and set-up at the rig, the instrument may be subject to shock and vibration as well as temperature gradients that can degrade the performance and accuracy of the GC. Moreover, the degraded performance may not be readily apparent to rig personnel and can lead to faulty gas composition measurements.

There is a need in the industry for improved GC quality control methods, particularly automated quality control methods that can be implemented at the rig site.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 8 depicts a flow chart of one example GC quality control method.

FIGS. 9A and 9B (collectively FIG. 9) depict example plots of FID detector output versus time for which the GC apparatus passes (FIG. 9A) and fails (FIG. 9B) the QC check of FIG. 8.

DETAILED DESCRIPTION

Methods and systems for quality control checking a gas chromatography apparatus at a rig site, the GC apparatus including at least a main column, a sample collection loop, and a detector in fluid communication with a multiport valve. The method includes making first and second detector measurements when the multiport valve is set in corresponding first and second positions and a carrier gas inlet is open. The first position provides fluid communication between the carrier gas inlet, the sample collection loop, the main column, and the detector and the second position provides fluid communication between the carrier gas inlet, the main column, and the detector such that carrier gas bypasses the sample collection loop. The method further includes comparing the first and second detector measurements to check at least the sample loop and the multiport valve for leaks.

Figure 1:
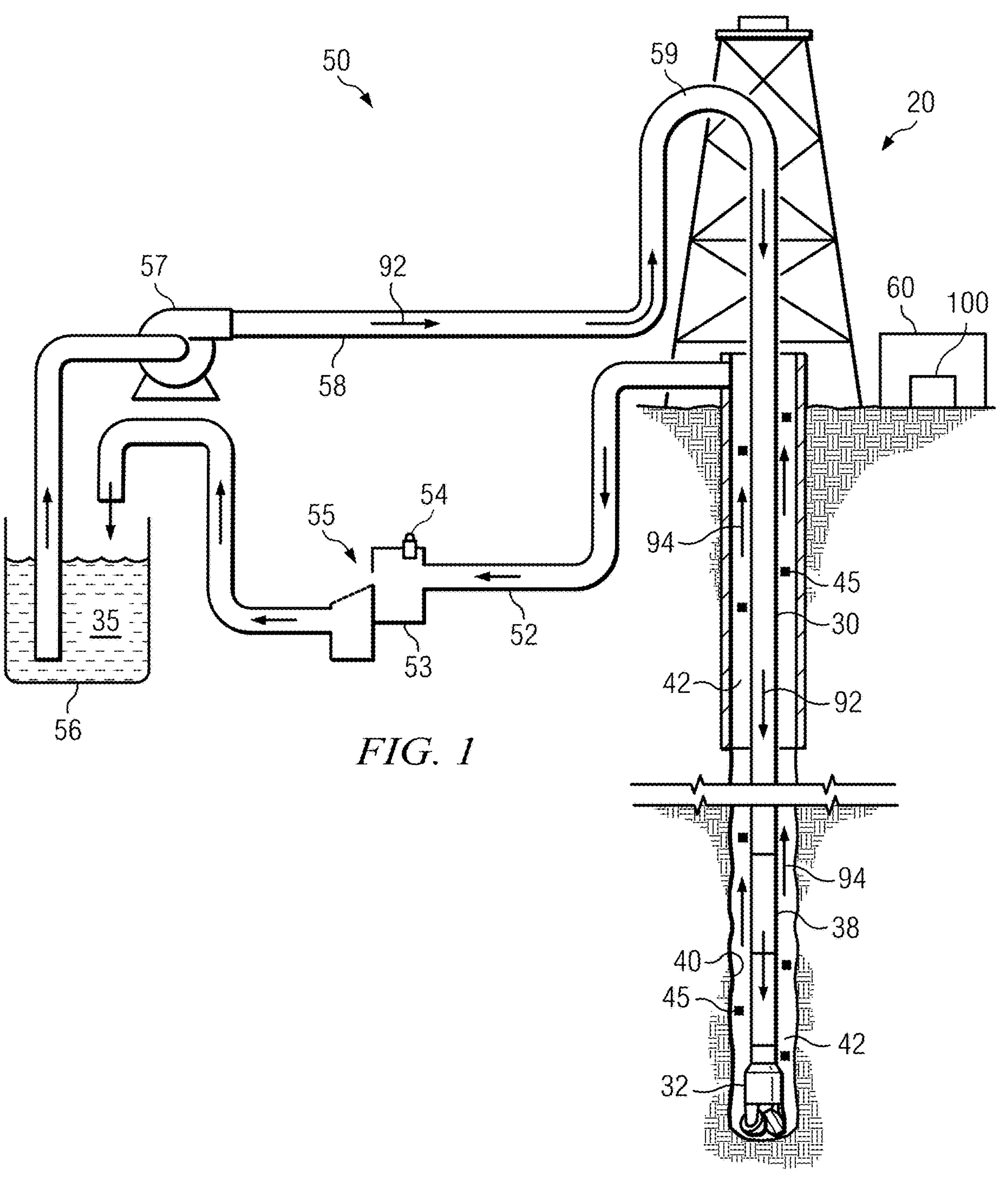
FIG. 1 depicts an example drilling rig including a disclosed gas chromatography apparatus.

FIG. 1 depicts an example drilling rig 20 including a disclosed GC apparatus 100 that may be configured to automatically perform a quality control check. The drilling rig 20 may be positioned over a subterranean formation (not shown). The rig 20 may include, for example, a derrick and a hoisting apparatus (also not shown) for raising and lowering a drill string 30, which, as shown, extends into wellbore 40 and includes, for example, a drill bit 32 and one or more downhole measurement tools 38 (e.g., a logging while drilling tool or a measurement while drilling tool) in a bottom hole assembly (BHA) above the bit 32. The BHA may of course include other tools, for example, including a steering tool such as a rotary steerable tool and a mud motor. The disclosed embodiments are not limited to any particular BHA configuration.

Drilling rig 20 further includes a surface system 50 for controlling the flow of drilling fluid used on the rig (e.g., used in drilling the wellbore 40). In the example rig depicted, drilling fluid 35 may be pumped downhole (as depicted at 92), for example, via a conventional mud pump 57. The drilling fluid 35 may be pumped, for example, through a standpipe 58 and mud hose 59 in route to the drill string 30. The drilling fluid 35 may emerge from the drill string 30 at or near the drill bit 32 and create an upward flow 94 of mud through the wellbore annulus 42 (the annular space between the drill string and the wellbore wall). The drilling fluid 35 then flows through a return conduit 52 to a mud pit system 56 where it may be recirculated. It will be appreciated that the terms drilling fluid and mud are used synonymously herein.

The circulating drilling fluid 35 is intended to perform many functions during a drilling operation, one of which is to carrying drill cuttings 45 to the surface (in upward flow 94). The drill cuttings 45 are commonly removed from the returning mud via a shale shaker 55 (or other similar solids control equipment) in the return conduit (e.g., immediately upstream of the mud pits 56).

Gases that are released or generated during drilling may also be carried to the surface in the circulating drilling fluid 35. As is known to those of ordinary skill in the art, formation gas may be released into the wellbore 40 via the drilling process (e.g., crushing the formation rock by the mechanical action of the drill bit) and may also migrate into the wellbore 40, for example, via fractures in the formation rock. The drilling process may also generate gases, for example, via drill bit metamorphism (DBM). Once in the wellbore, the gases may be transported to the surface via the drilling fluid (in the upwardly flowing fluid 94). These gasses, which may be dissolved in the mud or in the form of bubbles, are commonly removed from the drilling fluid, for example, via one or more degassers 54 located in or near a header tank 53 that is immediately upstream of the shale shaker 55 in the example depiction. The disclosed embodiments are not necessarily limited in regards to how the gas is sampled. The drill cuttings 45 and the extracted gases are commonly examined at the surface to assist the drilling operation and to evaluate the formation layers and the reservoir though which the wellbore is drilled.

With further reference to FIG. 1, drilling rig 20 may further include a testing facility 60 (e.g., a mud logging system or a laboratory trailer including one or more instruments suitable for making various measurements of sampled gases in the drilling fluid). In the depicted embodiment, the testing facility 60 includes the GC instrument 100. The testing facility 60 may, of course, include numerous other testing instruments known to those of ordinary skill.

It will of course be appreciated that while FIG. 1 depicts a land rig 20, that the disclosed embodiments are equally well suited for land rigs or offshore rigs. As is known to those of ordinary skill, offshore rigs commonly include a platform deployed atop a riser that extends from the sea floor to the surface. The drill string extends downward from the platform, through the riser, and into the wellbore through a blowout preventer (BOP) located on the sea floor. The disclosed embodiments are expressly not limited in these regards.

Figure 2:
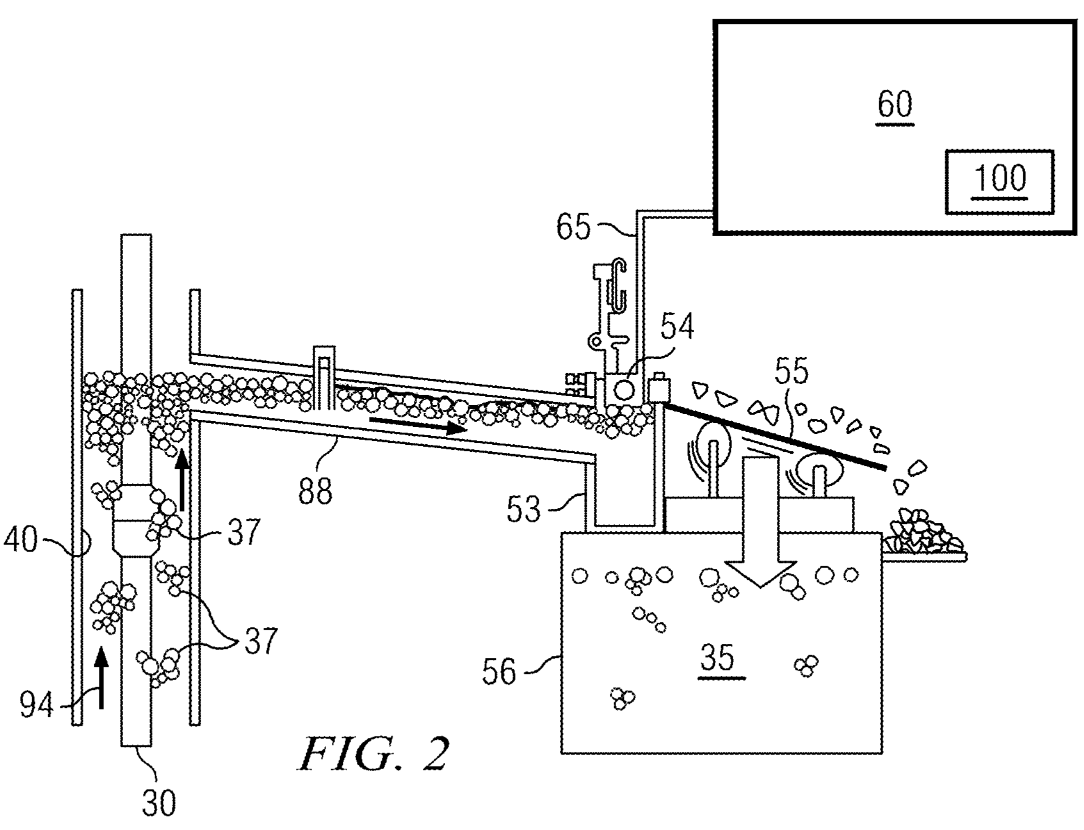
FIG. 2 depicts another view of a portion of the surface system shown on FIG. 1.

FIG. 2 depicts another view of a portion of surface system 50. As described above, the return conduit is configured to carry drilling fluid 35 (sometimes including gas bubbles 37) from wellbore 40 to mud pit 56. The example system includes a degasser 54 deployed, for example, in or near a header tank 53 that is immediately upstream of the shale shaker 55 and mud pit 56. In this example configuration, the degasser 54 is configured to remove gases in the drilling fluid that emerges from the wellbore 40 (referred to in the industry as gas-out). It will be appreciated that the disclosed embodiments are not limited in this regard. For example, the degasser 54 may include first and second degassers, the first configured to make gas-out measurements and the second deployed downstream of the mud pump so as to make gas-in measurements.

It will be further appreciated that the disclosed embodiments are not limited to the use of a degasser as depicted. Alternative embodiments may also (or additionally) make use of a gas probe located in the conduit 52 or at the surface of the well 40. In example embodiments, the degasser (or degassers) 54 may be piped directly to the mud logging unit or rig laboratory 60 and/or GC apparatus 100 (e.g. as depicted at 65), for example, to automatically transport the sampled gases for compositional testing.

It will be appreciated that system 50 may include substantially any suitable degasser (or degassers) 54, for example, including a vacuum degasser, a centrifugal degasser, and an impeller degasser. The degasser 54 may further be configured to heat the drilling fluid 35 to promote enhanced degassing of the fluid. The disclosed embodiments are not limited in regard to the type of degasser employed. Moreover, while not depicted, the system 50 may include one or more pumps (e.g., suction or pressure boosting pumps) configured to pump sampled gas from the degasser (s) 54 and/or the gas probe to the laboratory 60. The disclosed embodiments are, of course, not limited in regards to any sampling, pumping, or gas transport configurations.

Figure 3:
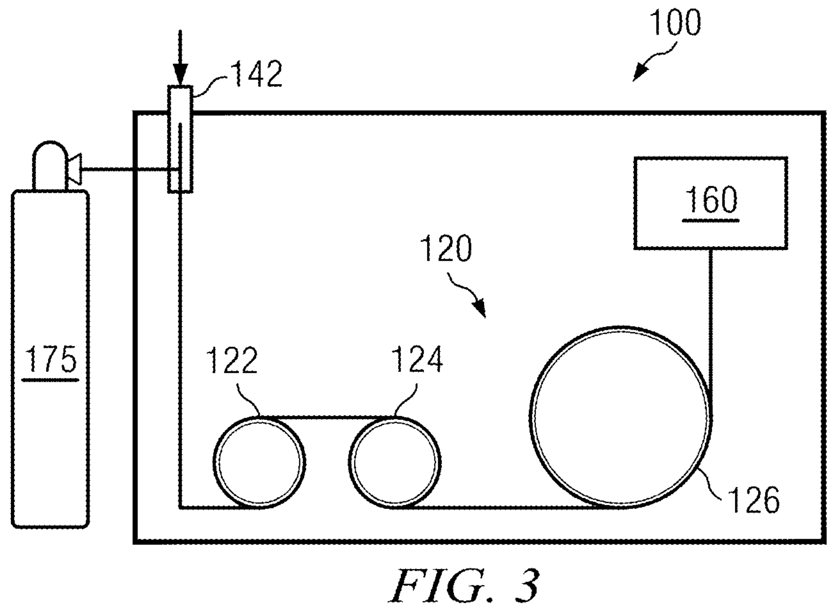
FIG. 3 depicts an example gas chromatography apparatus.

FIG. 3 depicts an example GC apparatus 100 including a gas sample injection port 142 configured to feed a gas sample into an example column assembly 120 including a precut column 124 and a main GC column 126. The GC apparatus 100 further includes a carrier gas supply 175, such as a supply of compressed nitrogen, argon, helium, or air. An injected gas sample may be mixed with the carrier gas and transported through the column assembly 120. The GC apparatus may further optionally include a trapping column 122 in series with the precut column and configured to remove interfering compounds in the gas stream such as alcohols. The precut column 124 may be configured to remove heavier hydrocarbon compounds having a number of carbon atoms above a threshold, such as C6, C8, or C10 and above. The main column 126 includes a stationary phase and may be configured to separate the various gas compounds in the gas sample such that they arrive at the detector 160 at distinct elution times, for example, such that C1 arrives before C2, which arrives before C3, and so on. The detector may include substantially any suitable GC detector, such as a flame ionization detector (an FID detector), a TC detector, or a mass spectrometer. Moreover, while the example GC apparatus 100 includes a trapping column 122 and a precut column 124, it will be appreciated that the disclosed embodiments are not limited in this regard. The disclosed embodiments are equally well suited for a GC apparatus including only a main column or a GC apparatus including a main column and a precut column.

Figure 4:
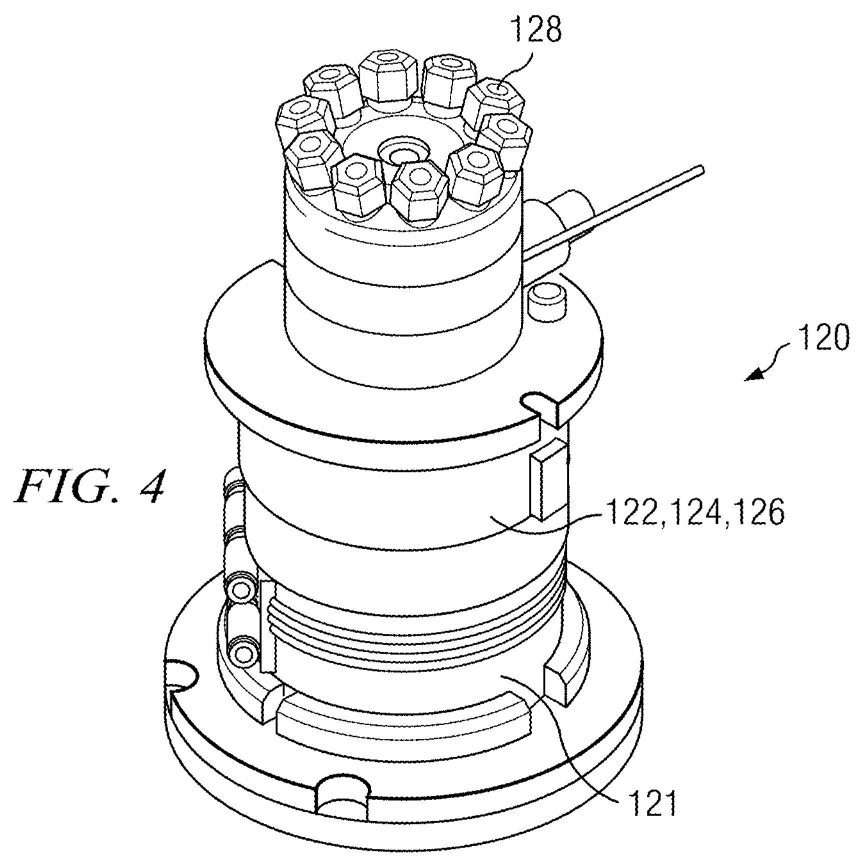
FIG. 4 depicts an example column assembly in which multiple columns are coupled with a multiport valve.

FIG. 4 depicts an example column assembly 120 (e.g., including a main column and a precut column) deployed about a mandrel 121 (the columns are not depicted individually in this figure). The columns 122, 124, 126 are in fluid communication with a multiport (e.g., 10 port) valve 128. As described in more detail below, the multiport valve 128 enables the gas sample to be routed through the various columns to the detector 160 (FIG. 2). The depicted column assembly 120 may further optionally include one or more heating elements (also not shown) deployed on the mandrel 121. The heating element(s) may enable the temperature of the mandrel and the columns to be controlled and/or held, for example, at any temperature up to about 200 degrees C.

Figure 5:
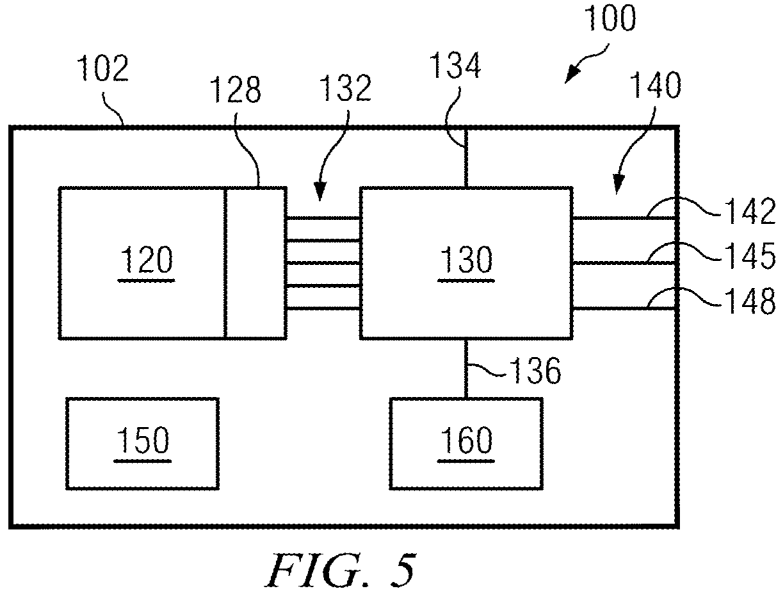
FIG. 5 depicts a block diagram of an example GC apparatus including the column assembly shown on FIG. 4.

FIG. 5 depicts a block diagram of example GC apparatus 100 including the column assembly 120 shown on FIG. 3. As depicted, the column assembly is deployed in the GC housing 102. The apparatus further includes a flow manifold 130 in fluid communication with the multiport valve 128. The flow manifold 130 may include, for example, a number of controllable valves, pressure regulators, and flow regulators (not shown). In the depicted embodiment, the flow manifold is in fluid communication with the multiport valve 128 via a plurality of flow passageways at 132, an external vent at 134, a plurality of gas inlet ports at 140, and the GC detector 160 at 136. The inlet ports may include for example, a gas sample injection port 142, a carrier gas injection port 145, and a reverse flow injection port 148.

GC apparatus 100 may further include an electronic controller 150 configured to control the detector 160, the flow manifold 130, the injection ports, and the position of the multiport valve 128. The controller 150 may be further configured to execute methods 200, 250, 270, and 300 described in more detail below with respect to FIGS. 8, 10, and 12. It will, of course, be appreciated that the controller may include computer hardware and software configured to cause the GC apparatus to perform the above described functions including the disclosed quality control checks. The hardware may include one or more processors (e.g., microprocessors) which may be connected to one or more data storage devices (e.g., hard drives or solid state memory) and user interfaces. It will be further understood that the disclosed embodiments may include processor executable instructions stored in the data storage device. The disclosed embodiments are, of course, not limited to the use of or the configuration of any particular computer hardware and/or software.

Figure 6:
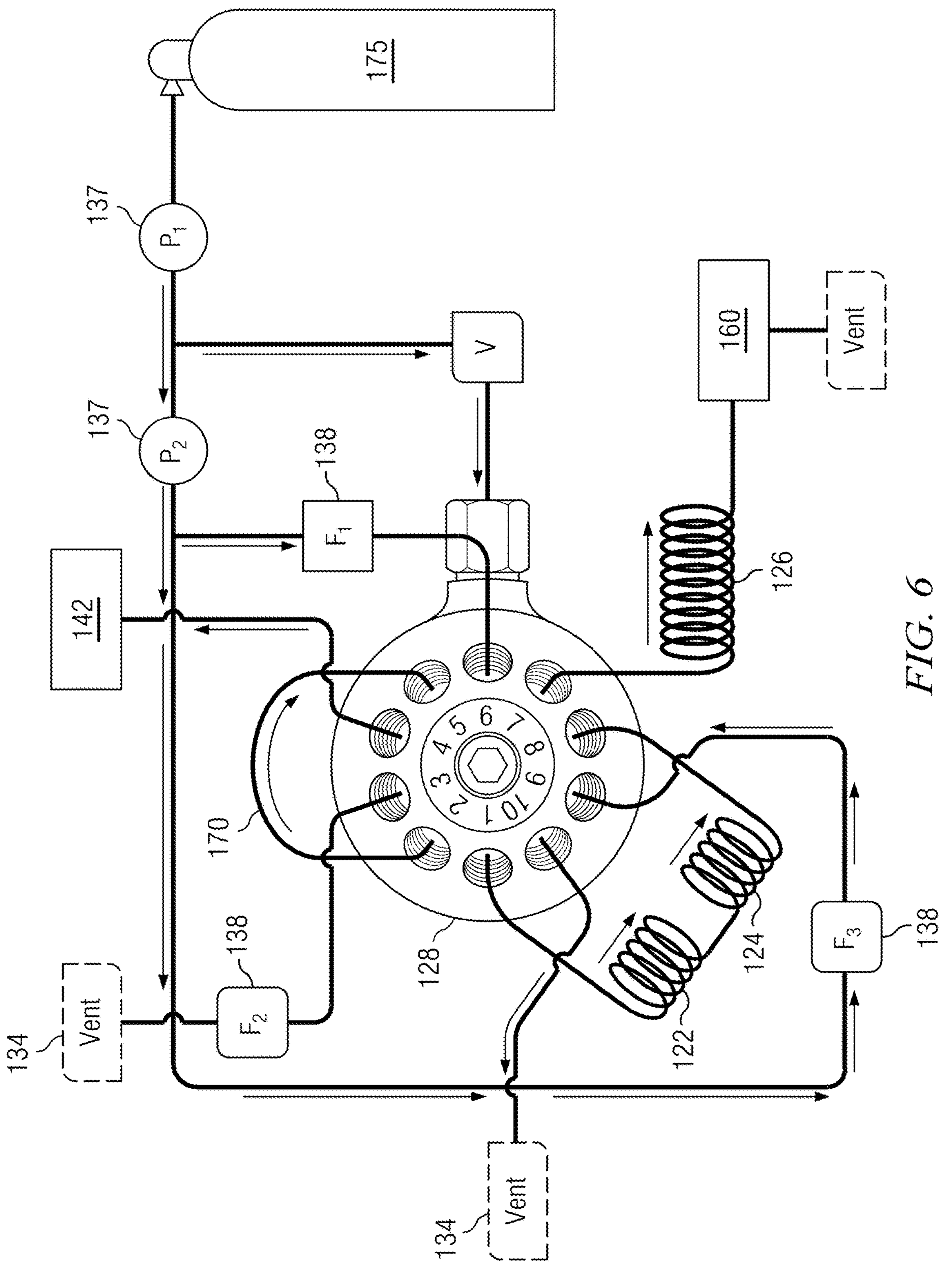
FIG. 6 depicts a schematic of the GC apparatus shown on FIG. 5.

FIG. 6 depicts a schematic of the GC apparatus shown on FIG. 5. As depicted, in this example embodiment, the trapping column 122, the precut column 124, and the main column 126 are in fluid communication with the multiport valve 128. In particular, the trapping column 122 and precut column 124 are coupled in series and are in fluid communication with ports 1 and 8 of the multiport valve 128. The main column 126 is in fluid communication with port 7 and the detector 160. The carrier gas supply 175 is in fluid communication with ports 6 and 9 in this particular embodiment. In alternative embodiments, the carrier gas supply may be fluid communication with port 6 and a separate gas supply (such as a backflush gas) may be in fluid communication with port 9. The gas sample injection port 142 is in fluid communication with port 4. A sample collection loop 170 is in fluid communication with ports 2 and 5. Ports 3 and 10 are vented. The example GC apparatus 100 depicted further includes a plurality of pressure regulators 137 and flow regulators 138, as well as vent lines 134.

As is evident in FIGS. 3-6, a rig-site GC analyzer (such as GC apparatus 100) is a complex instrument. A GC apparatus is commonly assembled manually with the quality of the analyzer often being sensitive to even the smallest assembly errors. For example, a connection may leak if it is not sufficiently tight or may cause a flow restriction if it is overtightened. However, the same overtightening may also cause a crack (and a leak) in the manifold. Moreover, the condition of many of the critical assembly elements are not readily detected though visual inspection. For example, incorrect insertion of a column into the manifold may negatively affect the shape of the chromatographic peaks. However, the detection of these subtle anomalies is operator-dependent and not always reliable.

Aging, damage, and contamination can compromise the integrity of the assembled GC apparatus. For example, premature aging of the column due to upset process conditions may strongly affect chromatographic resolution. Moreover, leaks can result from connector aging or a loss of sealing on connectors. Substandard quality or aging of the gas columns may also generate particles that can enter the system and damage manifolds and valves. There is a need in the industry for improved quality control methods, particularly automated quality control methods that can be implemented at the rig site.

Figures 7A, 7B:
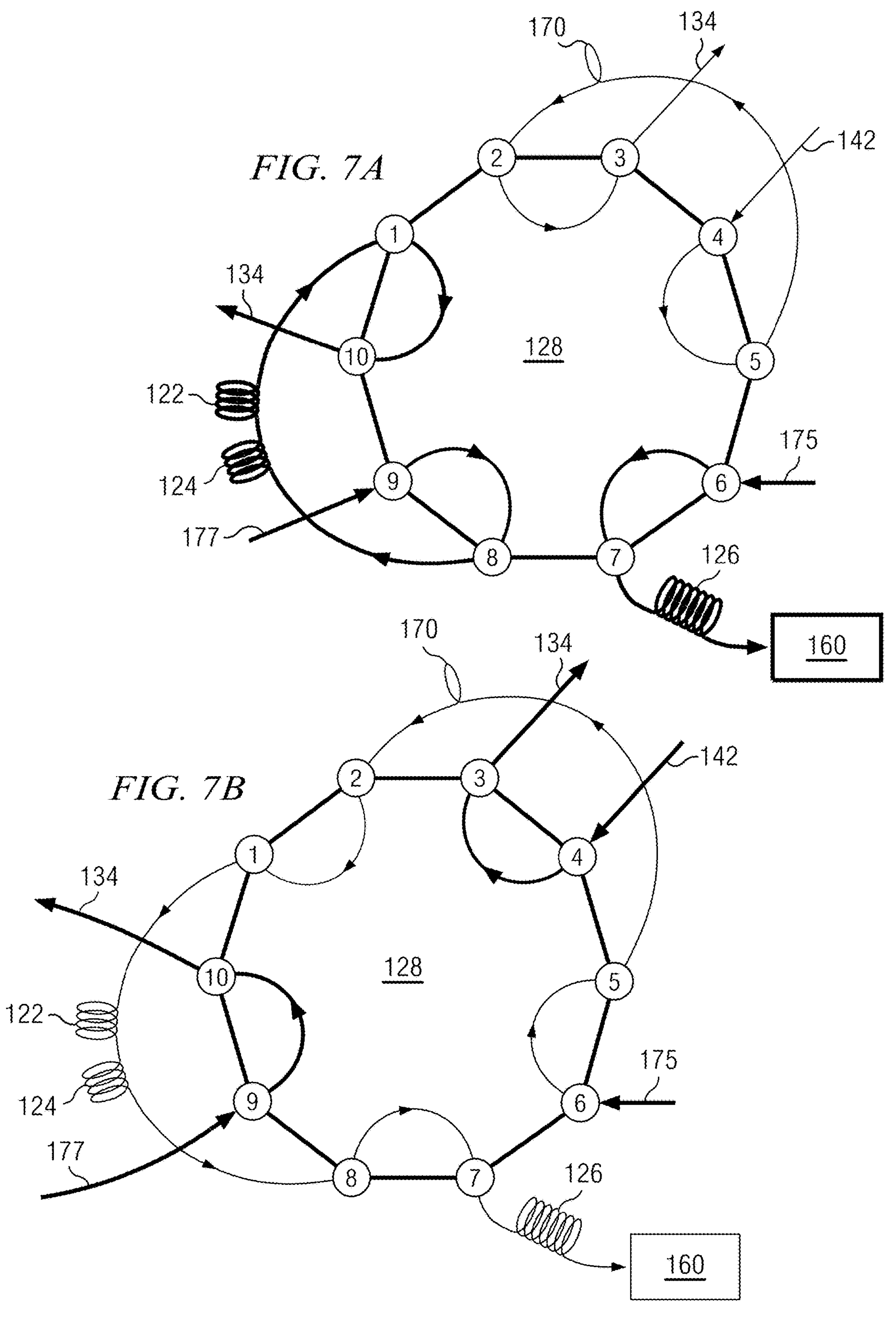
FIGS. 7A and 7B (collectively FIG. 7) depict example flow diagrams for the gas chromatography apparatus shown in FIGS. 5 and 6 in which the multiport valve is in a second position in FIG. 7A and a first position in FIG. 7B.

FIGS. 7A and 7B (collectively FIG. 7) depict example flow diagrams for the gas chromatography apparatus shown in FIG. 6 in which the multiport valve 128 is in a second position in FIG. 7A and a first position in FIG. 7B. When the valve is in the second position, port 2 is in fluid communication with port 3, port 4 is in fluid communication with port 5, and so on. When the valve is in the first position, port 1 is in fluid communication with port 2, port 3 is in fluid communication with port 4, and so on.

In FIG. 7A, when the multiport valve in the second position, the sample collection loop 170 is filled, the precut column 124 and trapping column 122 are flushed with carrier gas (or another gas) in reverse flow (e.g., to remove heavier hydrocarbons and interfering gases from the columns) and the carrier gas inlet 175 is in fluid communication with the main column 126 via ports 6 and 7 and the detector 160. In this position the carrier gas bypasses the sample collection loop 170 and trapping column 122 and precut column 124. As further depicted, the sample injection port 142 is in fluid communication with the sample collection loop 170 via ports 4 and 5. The trapping column 122 and precut column 124 are in fluid communication with gas supply 177 through ports 9 and 8. Carrier gas (or other backflush gas such as air) flows through the precut column 124 and the trapping column 122 in a reverse direction (to flush the columns) and vents through ports 1 and 10. The carrier gas supply 175 may be coupled to the main column 126 through ports 6 and 7 and vents through the detector (not shown in FIG. 7A).

In FIG. 7B, when the multiport valve 128 is in the first position, the gas sample in the sample loop 170 is transferred through the trapping column 122, the precut column 124, and the main column 126 in the forward direction to the detector. In particular, as depicted, the carrier gas supply 175 is in fluid communication with the sample loop 170 via ports 6 and 5, the trapping and precut columns via ports 2 and 1, and the main column 126 and detector 160 via ports 8 and 7. The sample injection port 142 is vented through ports 4 and 3 and the carrier gas (or other backflush gas) supply 177 is vented through ports 9 and 8.

Turning now to FIG. 8, a flow chart of one example GC quality control method 200 is depicted. Method 200 is conducted with the carrier gas inlet open and may include opening the carrier gas inlet at the onset of the method (at 201). The method 200 includes setting a GC multiport valve to a first position (e.g., as in FIG. 7B) at 202 and flowing carrier gas through the sample loop, the precut column loop, and the main column to a detector (e.g., an FID detector) at a constant flow rate (e.g., the same flow rate as used in standard GC measurements). The detector response may be measured at 204 while flowing the carrier gas through the sample loop, the precut column, and the main column to the detector. After some predetermined time interval (e.g., in a range from about 30 seconds to a few minutes), the multiport valve may be set to a second position (e.g., as in FIG. 7A) at 206 and the carrier gas may be flowed through the main column to the detector at the same constant flow rate (bypassing the sample loop and the precut column loop). The detector response may be measured at 208 while flowing the carrier gas through the main column to the detector. Steps 202, 204, 206, and 208 may be repeated substantially any number of times to flush or condition the apparatus or to provide averaged detector measurements. The detector responses measured at 204 and 208 may be compared at 210 to evaluate the integrity of the sample loop, the multiport valve, and the precut column (e.g., to check the sample loop, the precut column loop, and the multiport valve for leaks).

With continued reference to FIG. 8, the method 200 may advantageously be conducted automatically by an electronic controller deployed in the GC apparatus (e.g., controller 150 shown in FIG. 5). For example, the detector responses may be automatically evaluated at the end of each interval at some time before switching the multiport valve between the first and second positions. The multiport valve, the sample loop, and/or the precut column may be determined to be substantially leak free when the detector responses at 204 and 208 are equal to one another (within a threshold). The multiport valve, the sample loop, and the precut column may be determined to have a leak when the detector responses at 204 and 208 are not equal to one another (in particular, when the detector response at 204 is less than the detector response at 208).

FIGS. 9A and 9B depict example plots of FID detector output versus time for which the GC apparatus passes the QC check (FIG. 9A) and fails the QC check (FIG. 9B) of method 200. In FIG. 9A, the multiport valve is in the first position (with the carrier gas flowing through the sample loop and a precut column loop) from 0 to 60 seconds and in the second position (with the carrier gas bypassing the sample loop in the precut column loop) from 60 to 120 seconds. The initial transient 212 observed from 0 to about 10 seconds results from switching the multiport valve from the second position to the first position at time zero. The detector response then reaches a steady state as indicated at 214. The detector measurement made at 204 may be taken, for example, at 214 (either manually or automatically). The smaller transient 216 observed from 60 to about 70 seconds results from switching the multiport valve from the first position to the second position at time 60 seconds. The detector response then reaches a steady-state as indicated at 218. The detector measurement made at 208 may be taken, for example, at 218 (either manually or automatically). Note that in FIG. 9A, the detector responses at 214 and 218 are substantially equal to one another (within a threshold), thereby indicating that the GC apparatus passes this QC test and indicates that the multiport valve, the sample loop, and the precut column loop are free of leaks.

In FIG. 9B, the measurements are obtained the same way (i.e., the multiport valve is switched between the first and second positions with a constant carrier gas flow rate). The same transients 212 and 216 are observed at 0 and 60 seconds (corresponding to changing the multiport valve position). Moreover, the detector response reaches the same steady state at 218 when the multiport valve is in the second position and the carrier gas bypasses the sample loop and the precut column loop. The plot in FIG. 9B differs from the plot in FIG. 9A in that the detector response reaches a lower steady-state (or non-steady-state) value 220 when the multiport valve is in the first position such that the detector measurements at 204 and 208 are not equal to one another (the detector response at 220 is less than that at 218). This inequality indicates a leak in the sample loop, the precut column loop, and/or the multiport valve (or one of the connections thereto). It will be appreciated that the magnitude of the difference between the detector responses at 218 and 220 may provide an indication of the severity of the leak, with a larger difference indicating a more severe leak.

Figures 10A, 10B:
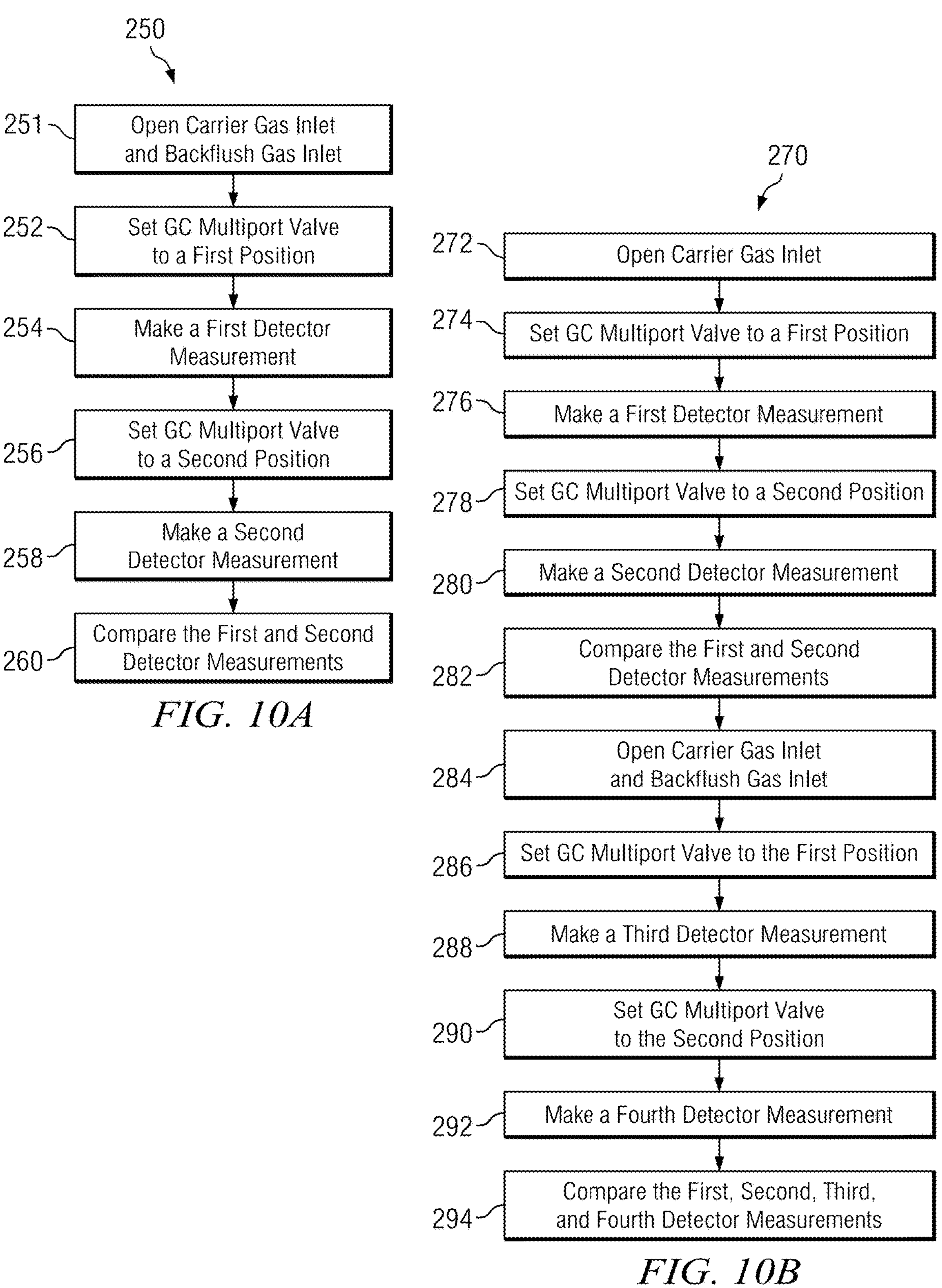
FIGS. 10A and 10B (collectively FIG. 10) depict flow charts of other example GC quality control methods.

Turning now FIG. 10A, a flow chart of another example GC quality control method 250 is depicted. Method 250 is similar to method 200 in that the detector response is monitored as the multiport valve switches between the first and second positions. Method 250 differs from method 200 in that the measurements are made with both the carrier gas flow rate and the backflush gas flow rate set to constant values (e.g., the usual measurement rates). Method 250 is conducted with both the carrier gas inlet and the backflush gas inlet open and may include opening the carrier gas inlet and the backflush gas inlet at the onset of the method (at 251).

Method 250 includes setting a GC multiport valve to a first position (e.g., as in FIG. 7B) at 252. Carrier flows through the sample loop, the precut column loop, and the main column to a detector (e.g., an FID detector) at a constant flow rate as described above. Backflush gas is also vented at 252 as also described above with respect to FIG. 7B. The detector response may be measured at 254 while flowing the carrier gas and backflow gas. After some predetermined time interval (e.g., in a range from about 30 seconds to a few minutes), the multiport valve may be set to the second position (e.g., as in FIG. 7A) at 256. The carrier gas flows through the main column to the detector (bypassing the sample loop and the precut column loop) at the same constant flow rate. The backflush gas also flows in the reverse direction through precut column loop. The detector response may be measured at 258 while flowing the carrier gas and backflush gas. Steps 252, 254, 256, and 258 may be repeated substantially any number of times as described above. The detector responses measured at 254 and 258 may be compared at 260 to evaluate the integrity of the multiport valve and precut column loop (to check for leaks therein).

With continued reference to FIG. 10A, the method 250 may advantageously be conducted automatically by an electronic controller deployed in the GC apparatus (e.g., controller 150 shown in FIG. 5). Moreover, the evaluation may be conducted in combination with the measurements collected using method 200 (FIG. 8). As described above, the detector responses may be evaluated at the end of each interval at some time before switching the multiport valve between the first and second positions. When methods 200 and 250 are conducted together, the detector measurements made at 204, 208, 254, and 258 may be compared with one another. The precut flow loop and the multiport valve may be determined to be leak free when they detector responses at 254 and 258 are equal to one another and equal to the detector responses at 204 and 208 of method 200. The precut flow loop and the multiport valve may be determined to have a leak when the detector responses at 254 and 258 are not equal to one another or not equal to the detector responses 204 and 208 from method 200.

Of further interest is the shape and sign of the initial transient observed when setting the multiport valve to the first position from the second position. Moreover, the precut flow loop and the multiport valve may be determined to be substantially leak free when the initial transient is positive (increasing detector response) or has the opposite sign of the transient observed in method 200 (as described in more detail below with respect to FIG. 11. The precut flow loop and the multiport valve may be determined to have a leak when no initial transient is observed, when the initial transient is negative (decreasing detector response), or when the initial transient has the same sign as measured in method 200.

FIG. 10B depicts an example method 270 in which methods 200 (FIG. 8) and 250 (FIG. 10A) may be combined. Method 270 includes opening the carrier gas inlet at 272. The GC multiport valve is set to the first position at 274 and a first detector measurement is made at 276. The GC multiport valve is set to the second position at 278 and a second detector measurement is made at 280. The first and second detector measurements may be compared to 282. The carrier gas inlet and the backflush gas inlet may be opened at 284 (such that they are both opened together). The GC multiport valve may be set to the first position at 286 a third detector measurement may be made at 288. The GC multiport valve may be set to the second position at 290 and a fourth detector measurement may be made at 292. The first, second, third, and fourth detector measurements may then be compared at 294 to evaluate the GC apparatus for leaks.

Figure 11A:
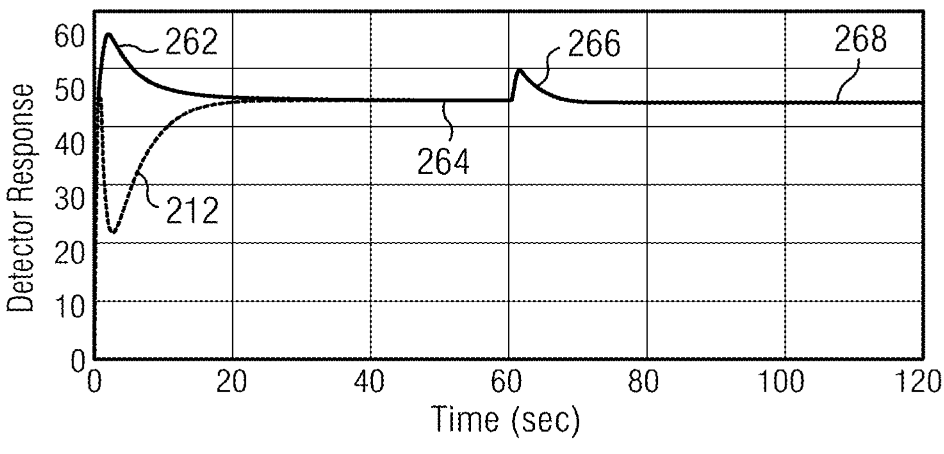
FIGS. 11A and 11B (collectively FIG. 11) depict example plots of FID detector output versus time for which the GC apparatus passes (FIG. 11A) and fails (FIG. 11B) the QC check of FIG. 10.
Figure 11B:
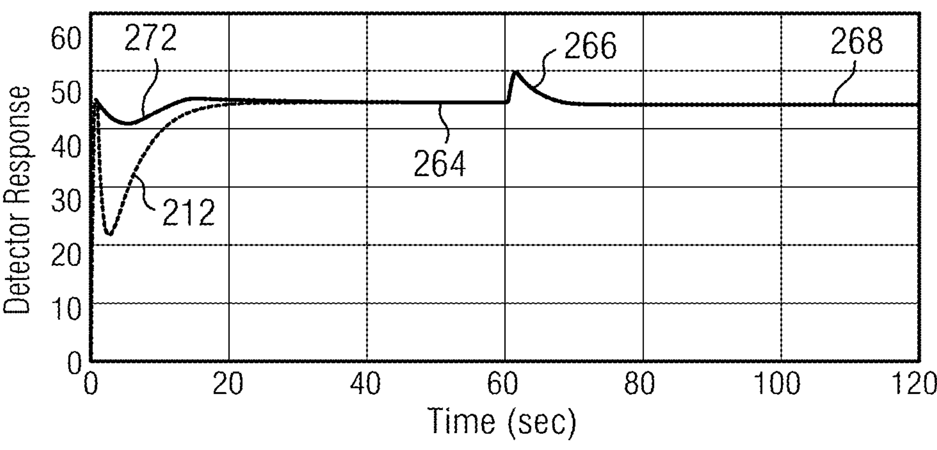

FIGS. 11A and 11B depict example plots of FID detector output versus time for which the GC apparatus passes the QC check (FIG. 11A) and fails the QC check (FIG. 11B) of method 250. In FIG. 11A, the multiport valve is in the first position (with the carrier gas flowing through the sample loop and a precut column loop) from 0 to 60 seconds and in the second position (with the carrier gas bypassing the sample loop in the precut column loop) from 60 to 120 seconds. The detector measurements from method 250 are plotted along with the measurements from method 200 (shown on FIG. 9A). As described above, the initial transient 262 observed from 0 to about 10 seconds results from switching the multiport valve from the second position to the first position at time zero. In this example, the pre-cut column causes a pressure drop when backflush air passes through it creating high pressure at the port connections, which results in a positive initial transient 262 when switching the multiport valve to the first position. The detector response then reaches a steady state as indicated at 264. The detector response measured at 254 may be taken at 264. The smaller transient 266 observed from 60 to about 70 seconds results from switching the multiport valve from the first position to the second position at time 60 seconds. The detector response then reaches as steady-state as indicated at 268. The detector response measured at 258 may be taken at 268. Note that in FIG. 11A, the detector responses at 264 and 268 are equal to one another and equal to the detector responses at 214 and 218 of FIG. 9A. Moreover, the initial transient 262 is positive and is of the opposite sign of the initial transient 212 in FIG. 9A, thereby indicating that the GC apparatus passes this QC test (with the multiport valve and precut flow loop being substantially free of leaks).

In FIG. 11B, the measurements are obtained the same way (i.e., the multiport valve is switched between the first and second positions with a constant carrier gas flow rate). The plot in FIG. 11B is similar to the plot in FIG. 11A in that the same steady state detector responses are observed at 264 and 268. The plot in FIG. 11B differs from the plot in FIG. 11A in that the initial transient 272 is negative (and of the same sign as the transient 212 in FIG. 9A) indicating a leak in the backflush flow line. It will be appreciated that the shape and magnitude of the initial transient 272 may provide an indication of the severity of the leak, the leak being more severe leak the closer transient 272 is to transient 212.

Figure 12:
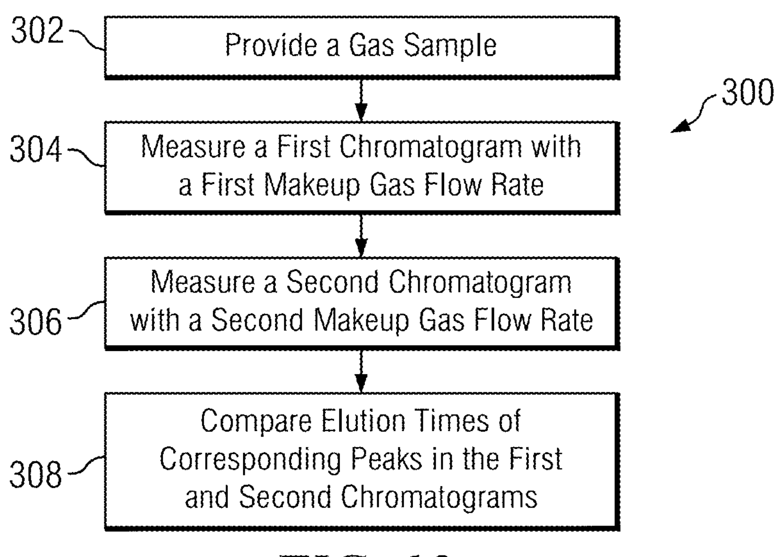
FIG. 12 depicts a flow chart of still another example GC quality control method.

Turning now to FIG. 12, a flow chart of still another example GC quality control method 300 is depicted. Method 300 is intended to evaluate the main column, a makeup gas flow line and the connections thereof to a detector manifold and is configured to indicate either leaks or flow restrictions therein. It will be appreciated, that while not described above with respect to GC apparatus 100, that GC measurements commonly employ the use of a makeup gas to supplement the flow of the gas sample through the main column. As is known to those of ordinary skill in the art, the supplemental makeup gas is used to maintain a stable flame within the flame ionization detector. Since the gas flow rate required for gas separation within the main column is often less than that required to optimize the FID flame, makeup gas is commonly employed. While the disclosed embodiments are not limited in this regard, hydrogen gas is often employed in oilfield applications.

Method 300 may include providing a gas sample, such as a calibration sample, at 302. The calibration sample may include a single gas component (e.g., a light hydrocarbon gas) or a plurality of gas components (e.g., C1, C2, C3, and so on). A first chromatogram is measured at 304 with a first makeup gas flow rate. A second chromatogram is measured at 306 with a second makeup gas flow rate that is greater than the first makeup gas flow rate. In example embodiments, the first makeup gas flow rate may be zero (such that no makeup gas is used to generate the first chromatogram). The elution times of a corresponding peak (or corresponding peaks) in the first and second chromatograms may be compared at 308 to evaluate the main column, the makeup flow line and the detector manifold. In particular, the connections may be found to have no leaks or restrictions (obstructions) when there is no difference (or a minimal difference within a threshold) between the elution times in the first and second chromatograms. In example embodiments, the threshold may be on the order of about 0.2 seconds (e.g., from about 0.05 to about 0.5 seconds or from about 0.1 to about 0.3 seconds) depending, of course, on the type and configuration of the GC apparatus. When the elution times of the peak or peaks in the second chromatogram (having the higher makeup gas flow rate) shift to earlier times than those in the first chromatogram, a leak is indicated. When the elution times of the peak or peaks in the second chromatogram shift to later times than those in the first chromatogram, an obstruction or restriction is indicated.

Figure 13A:
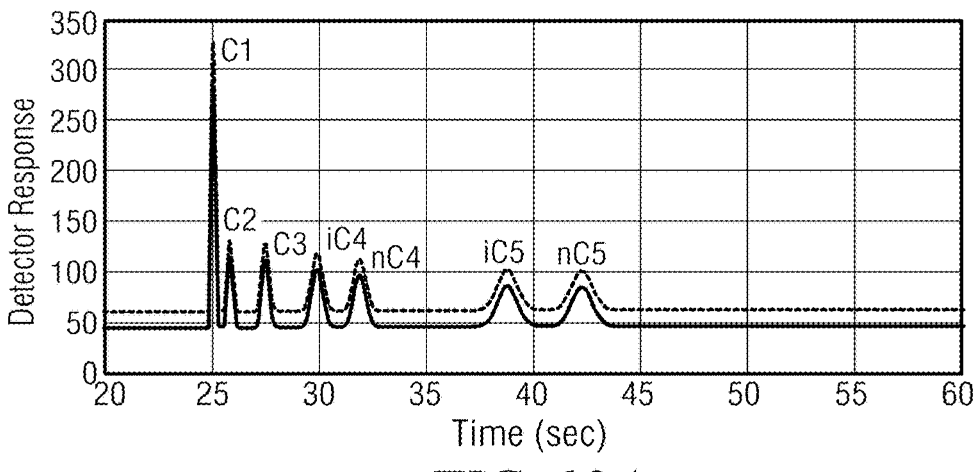
FIGS. 13A, 13B, and 13C (collectively FIG. 13) depict example chromatograms for which the GC apparatus passes (FIG. 13A) and fails (FIGS. 13B and 13C) the QC check of FIG. 12.
Figure 13B:
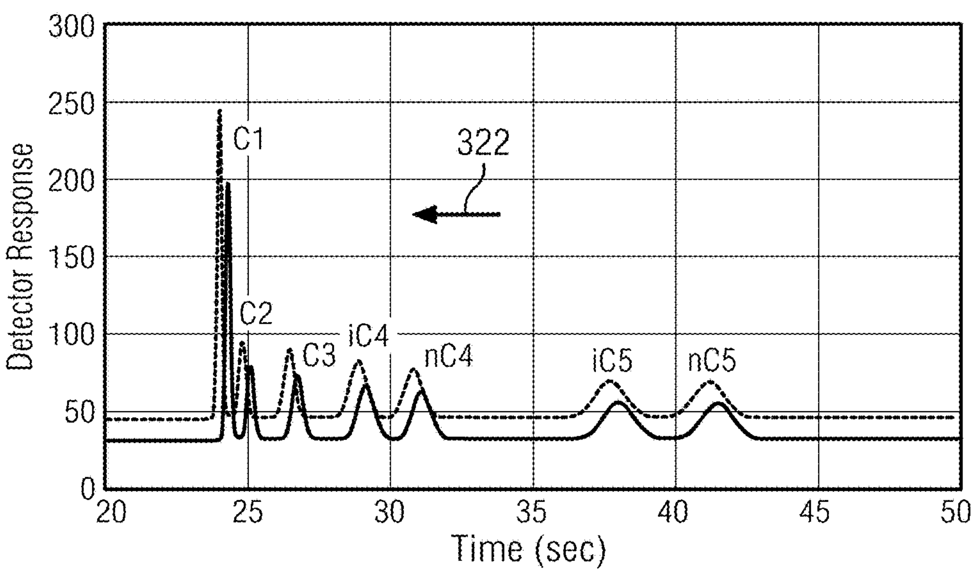
Figure 13C:
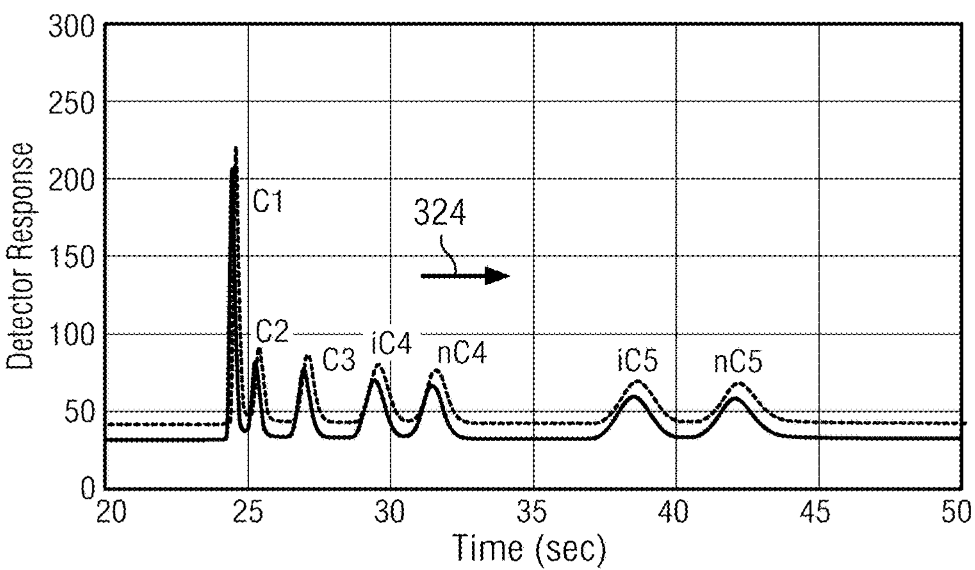

FIGS. 13A, 13B, and 13C (collectively FIG. 13) depict example chromatograms obtained using method 300 in which the first chromatogram is depicted using a solid line in the second chromatogram is depicted with a dashed line. A standard calibration mixture including C1, C2, C3, iC4, nC4, iC5, and nC5 gases was injected in the GC apparatus. In each of the figures, the first chromatogram (solid line) was obtained with a makeup flow rate of zero (no makeup flow) and the second chromatogram (dashed line) was obtained with a makeup flow rate of about 10 cubic centimeters per min.

In FIG. 13A, the elution times in the second chromatogram (dashed lines) are essentially equal to the elution times in the first chromatogram (with the difference in elution times being less than a threshold) indicating no or minimal leaking or obstruction of the makeup gas. In FIG. 13B, the elution times in the second chromatogram (dashed lines) are shifted to earlier times as shown at 322 indicating a possible (or likely) leak in the makeup gas flow line. In FIG. 13C, the elution times in the second chromatogram (dashed lines) are shifted to later times as shown at 324 indicating a possible (or likely) obstruction in the makeup gas flow line or the mandrel where the column flow, hydrogen gas, and make up gas are combined.

While the example in FIG. 13 shows chromatograms including C1-C5 gases, it will be understood that the disclosed embodiments are not so limited. Method 300 may be implemented with a gas sample having substantially any suitable number of gas components, for example, a gas sample having a single gas component, such as C1, C2, or C3, or a gas sample having any plurality of gas components including two, three, four, or more gas components. In such embodiments, the quality control check is intended to identify a potential leak or obstruction in the makeup gas flowline or mandrel based upon a corresponding shift in the elution times of the gas component(s). Moreover, it will be appreciated that the comparing and 308 may include computing average elution times of the multiple peaks in each of the first and second chromatograms and comparing the average elution times thereof.

With reference again to FIG. 12, the second chromatogram may be further evaluated to compute chromatographic parameters of the main column in the GC apparatus, for example, including retention coefficients, selectivity, resolution, and a number of theoretical plates in the column. These computed parameters may be further evaluated to assess column aging. Retention coefficients for each of the gas components in the gas sample may be computed with respect to C1 for example as follows:

$$k_{Cn} = \frac{t_{ret}Cn - t_{ret}C1}{t_{ret}C1}$$

where $k_{Cn}$ represents the retention coefficient of the nth gas component (e.g., where n=2 represents C2, n=3 represents C3, and so on) and $t_{ret}C1$ represents the elution (or retention) time of methane, and $t_{ret}Cn$ represents the elution time of the nth gas component (in the second chromatogram).

Selectivities may be calculated for any two components in the gas sample, for example as follows:

$$\alpha_i = \frac{k_1}{k_2}$$

where $\alpha_i$ represent the selectivities, $k_1$ represents the retention coefficient of a first component (e.g., the nth gas component as described above), and $k_2$ represents the retention coefficient of a second, different gas component. In this way a selectivity may be computed for any two gas components. For example, a selectivity may be computed between the nC5 and the C3 gas components when $k_1=k_{nC5}$ and $k_2=k_{C3}$.

A number of theoretical plates may be computed for a selected gas component, for example, as follows:

$$N = \left(\frac{t_{ret}Cn}{\sigma_{Cn}}\right)^2$$

where N represents the number of theoretical plates, $t_{ret}Cn$ is defined above, and $\sigma_{Cn}$ represents a parameter used in a Gaussian peak approximation that is a measure of the peak's width. The disclosed embodiments are of course not limited to any particular measure or estimate of the peaks width.

It will be appreciated that methods 200, 250, and/300 may be advantageously performed at the rig site without any need to disassemble or disconnect the GC apparatus from the well gas line. Moreover, the quality control checks may be performed at substantially any suitable service time interval or whenever it is needed. For example, the quality control checks may be performed at a regular QC interval, for example, at weekly, monthly, bi-monthly, quarterly, semi-annual, or annual intervals depending on the nature of the deployment and/or whenever GC measurements indicate potential leaks or obstructions. Moreover, it will be appreciated that the quality control checks may be advantageously performed during rig down times such as when the drill string is being tripped in our out of the well.

It will be understood that the present disclosure includes numerous embodiments. These embodiments include, but are not limited to, the following embodiments.

In a first embodiment, a method for quality control checking a GC apparatus includes providing a GC apparatus including at least a main column, a sample collection loop, and a detector in fluid communication with a multiport valve, the main column configured to separate light hydrocarbon compounds in a gas stream; opening a carrier gas inlet; setting the multiport valve to a first position with the carrier gas inlet open, the first position providing fluid communication between the carrier gas inlet, the sample collection loop, the main column, and the detector; making a first detector measurement when the multiport valve is set in the first position; setting the multiport valve to a second position with the carrier gas inlet open, the second position providing fluid communication between the carrier gas inlet, the main column, and the detector such that carrier gas bypasses the sample collection loop; making a second detector measurement when the multiport valve is set in the second position; and comparing the first detector measurement with the second detector measurement to check at least the sample loop and the multiport valve for leaks.

A second embodiment may include the first embodiment, wherein the quality control check indicates that there are no leaks in the sample collection loop or the multiport valve when a difference between the first detector measurement and the second detector measurement is less than a threshold.

A third embodiment may include any one of the first through second embodiments, wherein the quality control check indicates a leak in at least one of the sample collection loop and the multiport valve when the second detector measurement is greater than the first detector measurement.

A fourth embodiment may include any one of the first through third embodiments, wherein the making the first detector measurement further comprises making the first detector measurement when a detector response reaches a first steady state after a first initial transient when setting the multiport valve to the first position; the making the second detector measurement further comprises making the second detector measurement when the detector response reaches a second steady state after a second initial transient when setting the multiport valve to the second position.

A fifth embodiment may include any one of the first through fourth embodiments, wherein the opening, the setting the multiport valve to the first position, the making the first detector measurement, the setting the multiport valve to the second position, the making the second detector measurement, and the comparing are conducted automatically via a controller located in the GC apparatus.

A sixth embodiment may include any one of the first through fifth embodiments, wherein the GC apparatus further comprises a precut column loop including a precut column configured to remove hydrocarbon compounds from a gas stream having a number of carbon atoms above a threshold, the precut column being in fluid communication with the carrier gas inlet, the sample collection loop, the main column, and the detector when the multiport valve is in the first position; the carrier gas bypasses the sample collection loop and the precut column when the multiport valve is in the second position; and the quality control check indicates a leak in at least one of the sample collection loop, the precut column, or the multiport valve when the second detector response is greater than the first detector response.

A seventh embodiment may include the sixth embodiment, further comprising opening a precut column backflush gas inlet; setting the multiport valve to the first position with the carrier gas inlet open and the precut column backflush gas inlet open such that the backflush gas vents; making a third detector measurement when the multiport valve is set in the first position; setting the multiport valve to the second position with the carrier gas inlet open and the precut column backflush gas inlet open such that the backflush gas flows through the precut column in a reverse direction; making a fourth detector measurement when the multiport valve is set in the second position; and comparing the first, second, third, and fourth detector measurements to check a precut column flow loop including the precut column for leaks.

An eighth embodiment may include the seventh embodiment, further comprising evaluating a first initial transient in the detector response when setting the multiport valve to the first position with the carrier gas inlet open and the precut column backflush gas inlet closed; evaluating a second initial transient in the detector response when setting the multiport valve to the first position with the carrier gas inlet open and the precut column backflush gas inlet open; and comparing the first initial transient and the second initial transient to check the precut column flow loop for leaks.

A ninth embodiment may include the eighth embodiment, wherein the quality control check indicates that there are no leaks in the precut column flow loop when differences between the first, second, third, and fourth detector measurements are less than a threshold and when the second initial transient has an opposite direction than the first initial transient.

A tenth embodiment may include any one of the eighth through ninth embodiments, wherein the quality control check indicates a leak in the precut column flow loop when the third and fourth detector measurements are less than the first and second detector measurements or when the second initial transient has a same direction as the first initial transient.

In an eleventh embodiment a gas chromatography (GC) apparatus comprises: a sample collection loop, precut column loop including a precut column, a main column, a carrier gas inlet, and a reverse flow gas inlet in fluid communication with a multiport valve, the main column configured to separate light hydrocarbon compounds in a gas stream, the precut column configured to remove heavier hydrocarbon compounds from the gas stream; a GC detector in fluid communication with the main column; and an electronic controller configured to: open the carrier gas inlet; set the multiport valve to a first position with the carrier gas inlet open, the first position providing fluid communication between the carrier gas inlet, the sample collection loop, the precut column loop, the main column, and the detector; make a first detector measurement when the multiport valve is set in the first position; set the multiport valve to a second position with the carrier gas inlet open, the second position providing fluid communication between the carrier gas inlet, the main column, and the detector such that carrier gas bypasses the sample collection loop and the precut column loop; make a second detector measurement when the multiport valve is set in the second position; and compare the first detector measurement to the second detector measurement to check the sample loop, the precut column loop, and the multiport valve for leaks.

A twelfth embodiment may include the eleventh embodiment, wherein the controller is configured to indicate that there are no leaks in the sample collection loop, the precut column loop, or the multiport valve when a difference between the first detector measurement and the second detector measurement is less than a threshold; and the controller is configured to indicate that there is a leak in at least one of the sample collection loop, the precut column loop, and the multiport valve when the second detector measurement is greater than the first detector measurement.

A thirteenth embodiment may include any one of the eleventh through twelfth embodiments, wherein the controller is configured to make the first detector measurement when a detector response reaches a first steady state after a first initial transient when setting the multiport valve to the first position; and the controller is configured to make the second detector measurement when the detector response reaches a second steady state after a second initial transient when setting the multiport valve to the second position.

A fourteenth embodiment may include any one of the eleventh through thirteenth embodiments, wherein the controller is further configured to: open the precut column backflush gas inlet; set the multiport valve to the first position with the carrier gas inlet open and the precut column backflush gas inlet open such that the backflush gas vents; make a third detector measurement when the multiport valve is set in the first position; set the multiport valve to the second position with the carrier gas inlet open and the precut column backflush gas inlet open such that the backflush gas flows through the precut column in a reverse direction; make a fourth detector measurement when the multiport valve is set in the second position; and compare the first, second, third, and fourth detector measurements to check the precut column flow loop for leaks.

A fifteenth embodiments may include the fourteenth embodiment, wherein the controller is configured to indicate that there are no leaks in the precut column loop when differences between the first, second, third, and fourth detector measurements are less than a threshold and when a second initial transient in the detector response when setting the multiport valve to the first position with the carrier gas inlet open and the precut column backflush gas inlet open has an opposite direction than a first initial transient in the detector response when setting the multiport valve to the first position with the carrier gas inlet open and the precut column backflush gas inlet closed; and the controller is configured to indicate that there is a leak in the precut column loop when the third and fourth detector measurements are less than the first and second detector measurements or when the second initial transient has a same direction as the first initial transient.

In a sixteenth embodiment, a method for quality control checking a GC apparatus comprises providing a GC apparatus including at least a main column, a sample collection loop, a precut column loop including a precut column, and a detector in fluid communication with a multiport valve, the main column configured to separate light hydrocarbon compounds in a gas stream, the precut column configured to remove heavier hydrocarbon compounds from the gas stream; opening a carrier gas inlet and a precut column loop backflush inlet; setting the multiport valve to a first position with the carrier gas inlet open and the precut column loop backflush inlet open, the first position providing fluid communication between the carrier gas inlet, the sample collection loop, the precut column loop, the main column, and the detector; making a first detector measurement when the multiport valve is set in the first position; setting the multiport valve to a second position with the carrier gas inlet open and the precut column loop backflush inlet open, the second position providing fluid communication between the carrier gas inlet, the main column, and the detector such that carrier gas bypasses the sample collection loop and the precut column loop; making a second detector measurement when the multiport valve is set in the second position; and comparing the first detector measurement to the second detector measurement to check the sample loop, the precut column loop, and the multiport valve for leaks.

A seventeenth embodiment may include the sixteenth embodiment, wherein the quality control check indicates that there are no leaks in the sample collection loop, the precut column loop, or the multiport valve when a difference between the first detector measurement and the second detector measurement is less than a threshold.

An eighteenth embodiment may include any one of the sixteenth through seventeenth embodiments, wherein the quality control check indicates a leak in at least one of the sample collection loop, the precut column loop, and the multiport valve when the second detector measurement is greater than the first detector measurement.

A nineteenth embodiment may include any one of the sixteenth through eighteenth embodiments, further comprising evaluating an initial transient in a detector response when setting the multiport valve to the first position with the carrier gas inlet open and the precut column backflush gas inlet open.

A twentieth embodiment may include the nineteenth embodiment, wherein the quality control check indicates that there are no leaks in the precut column flow loop initial transient has a positive sign; and the quality control check indicates a leak in the precut column flow loop when the initial transient has a negative sign.

Although GC quality control methods have been described in detail, it should be understood that various changes, substitutions and alternations can be made herein without departing from the spirit and scope of the disclosure as defined by the appended claims.

The invention claimed is:

1. A method for quality control checking a gas chromatography (GC) apparatus, the method comprising:

providing a GC apparatus including at least a main column, a sample collection loop, and a detector in fluid communication with a multiport valve, the main column configured to separate light hydrocarbon compounds in a gas stream;

opening a carrier gas inlet;

setting the multiport valve to a first position with the carrier gas inlet open, the first position providing fluid communication between the carrier gas inlet, the sample collection loop, the main column, and the detector;

making a first detector measurement when the multiport valve is set in the first position;

setting the multiport valve to a second position with the carrier gas inlet open, the second position providing fluid communication between the carrier gas inlet, the main column, and the detector such that carrier gas bypasses the sample collection loop;

making a second detector measurement when the multiport valve is set in the second position; and comparing the first detector measurement with the second detector measurement to check at least the sample collection loop and the multiport valve for leaks.

2. The method of claim 1, wherein the quality control check indicates that there are no leaks in the sample collection loop or the multiport valve when a difference between the first detector measurement and the second detector measurement is less than a threshold.

3. The method of claim 1, wherein the quality control check indicates a leak in at least one of the sample collection loop and the multiport valve when the second detector measurement is greater than the first detector measurement.

4. The method of claim 1, wherein:

the making the first detector measurement further comprises making the first detector measurement when a detector response reaches a first steady state after a first initial transient when setting the multiport valve to the first position;

the making the second detector measurement further comprises making the second detector measurement when the detector response reaches a second steady state after a second initial transient when setting the multiport valve to the second position.

5. The method of claim 1, wherein the opening, the setting the multiport valve to the first position, the making the first detector measurement, the setting the multiport valve to the second position, the making the second detector measurement, and the comparing are conducted automatically via a controller located in the GC apparatus.

6. The method of claim 1, wherein:

the GC apparatus further comprises a precut column loop including a precut column configured to remove hydrocarbon compounds from a gas stream having a number of carbon atoms above a threshold, the precut column being in fluid communication with the carrier gas inlet, the sample collection loop, the main column, and the detector when the multiport valve is in the first position;

the carrier gas bypasses the sample collection loop and the precut column when the multiport valve is in the second position; and the quality control check indicates a leak in at least one of the sample collection loop, the precut column, or the multiport valve when the second detector measurement is greater than the first detector measurement.

7. The method of claim 6, further comprising:

opening a precut column backflush gas inlet;

setting the multiport valve to the first position with the carrier gas inlet open and the precut column backflush gas inlet open such that the backflush gas vents;

making a third detector measurement when the multiport valve is set in the first position;

setting the multiport valve to the second position with the carrier gas inlet open and the precut column backflush gas inlet open such that the backflush gas flows through the precut column in a reverse direction;

making a fourth detector measurement when the multiport valve is set in the second position; and comparing the first, second, third, and fourth detector measurements to check a precut column flow loop including the precut column for leaks.

8. The method of claim 7, further comprising:

evaluating a first initial transient in the detector response when setting the multiport valve to the first position with the carrier gas inlet open and the precut column backflush gas inlet closed;

evaluating a second initial transient in the detector response when setting the multiport valve to the first position with the carrier gas inlet open and the precut column backflush gas inlet open; and comparing the first initial transient and the second initial transient to check the precut column flow loop for leaks.

9. The method of claim 8, wherein the quality control check indicates that there are no leaks in the precut column flow loop when differences between the first, second, third, and fourth detector measurements are less than a threshold and when the second initial transient has an opposite direction than the first initial transient.

10. The method of claim 8, wherein the quality control check indicates a leak in the precut column flow loop when the third and fourth detector measurements are less than the first and second detector measurements or when the second initial transient has a same direction as the first initial transient.

11. A gas chromatography (GC) apparatus comprising:

a sample collection loop, precut column loop including a precut column, a main column, a carrier gas inlet, and a reverse flow gas inlet in fluid communication with a multiport valve, the main column configured to separate light hydrocarbon compounds in a gas stream, the precut column configured to remove heavier hydrocarbon compounds from the gas stream;

a GC detector in fluid communication with the main column; and an electronic controller configured to:

open the carrier gas inlet;

set the multiport valve to a first position with the carrier gas inlet open, the first position providing fluid communication between the carrier gas inlet, the sample collection loop, the precut column loop, the main column, and the detector;

make a first detector measurement when the multiport valve is set in the first position;

set the multiport valve to a second position with the carrier gas inlet open, the second position providing fluid communication between the carrier gas inlet, the main column, and the detector such that carrier gas bypasses the sample collection loop and the precut column loop;

make a second detector measurement when the multiport valve is set in the second position; and compare the first detector measurement to the second detector measurement to check the sample collection loop, the precut column loop, and the multiport valve for leaks.

12. The GC apparatus of claim 11, wherein:

the controller is configured to indicate that there are no leaks in the sample collection loop, the precut column loop, or the multiport valve when a difference between the first detector measurement and the second detector measurement is less than a threshold; and the controller is configured to indicate that there is a leak in at least one of the sample collection loop, the precut column loop, and the multiport valve when the second detector measurement is greater than the first detector measurement.

13. The GC apparatus of claim 11, wherein:

the controller is configured to make the first detector measurement when a detector response reaches a first steady state after a first initial transient when setting the multiport valve to the first position; and the controller is configured to make the second detector measurement when the detector response reaches a second steady state after a second initial transient when setting the multiport valve to the second position.

14. The GC apparatus of claim 11, wherein the controller is further configured to:

open a precut column backflush gas inlet;

set the multiport valve to the first position with the carrier gas inlet open and the precut column backflush gas inlet open such that the backflush gas vents;

make a third detector measurement when the multiport valve is set in the first position;

set the multiport valve to the second position with the carrier gas inlet open and the precut column backflush gas inlet open such that the backflush gas flows through the precut column in a reverse direction;

make a fourth detector measurement when the multiport valve is set in the second position; and compare the first, second, third, and fourth detector measurements to check a precut column flow loop for leaks.

15. The GC apparatus of claim 14, wherein the controller is configured to indicate that there are no leaks in the precut column loop when differences between the first, second, third, and fourth detector measurements are less than a threshold and when a second initial transient in the detector response when setting the multiport valve to the first position with the carrier gas inlet open and the precut column backflush gas inlet open has an opposite direction than a first initial transient in the detector response when setting the multiport valve to the first position with the carrier gas inlet open and the precut column backflush gas inlet closed; and the controller is configured to indicate that there is a leak in the precut column loop when the third and fourth detector measurements are less than the first and second detector measurements or when the second initial transient has a same direction as the first initial transient.

16. A method for quality control checking a gas chromatography (GC) apparatus, the method comprising:

providing a GC apparatus including at least a main column, a sample collection loop, a precut column loop including a precut column, and a detector in fluid communication with a multiport valve, the main column configured to separate light hydrocarbon compounds in a gas stream, the precut column configured to remove heavier hydrocarbon compounds from the gas stream;

opening a carrier gas inlet and a precut column loop backflush inlet;

setting the multiport valve to a first position with the carrier gas inlet open and the precut column loop backflush inlet open, the first position providing fluid communication between the carrier gas inlet, the sample collection loop, the precut column loop, the main column, and the detector;

making a first detector measurement when the multiport valve is set in the first position;

setting the multiport valve to a second position with the carrier gas inlet open and the precut column loop backflush inlet open, the second position providing fluid communication between the carrier gas inlet, the main column, and the detector such that carrier gas bypasses the sample collection loop and the precut column loop;

making a second detector measurement when the multiport valve is set in the second position; and comparing the first detector measurement to the second detector measurement to check the sample collection loop, the precut column loop, and the multiport valve for leaks.

17. The method of claim 16, wherein the quality control check indicates that there are no leaks in the sample collection loop, the precut column loop, or the multiport valve when a difference between the first detector measurement and the second detector measurement is less than a threshold.

18. The method of claim 16, wherein the quality control check indicates a leak in at least one of the sample collection loop, the precut column loop, and the multiport valve when the second detector measurement is greater than the first detector measurement.

19. The method of claim 16, further comprising evaluating an initial transient in a detector response when setting the multiport valve to the first position with the carrier gas inlet open and a precut column backflush gas inlet open.

20. The method of claim 19, wherein:

the quality control check indicates that there are no leaks in a precut column flow loop initial transient has a positive sign; and the quality control check indicates a leak in the precut column flow loop when the initial transient has a negative sign.

* * * * *